UNITED STATES PATENT OFFICE.

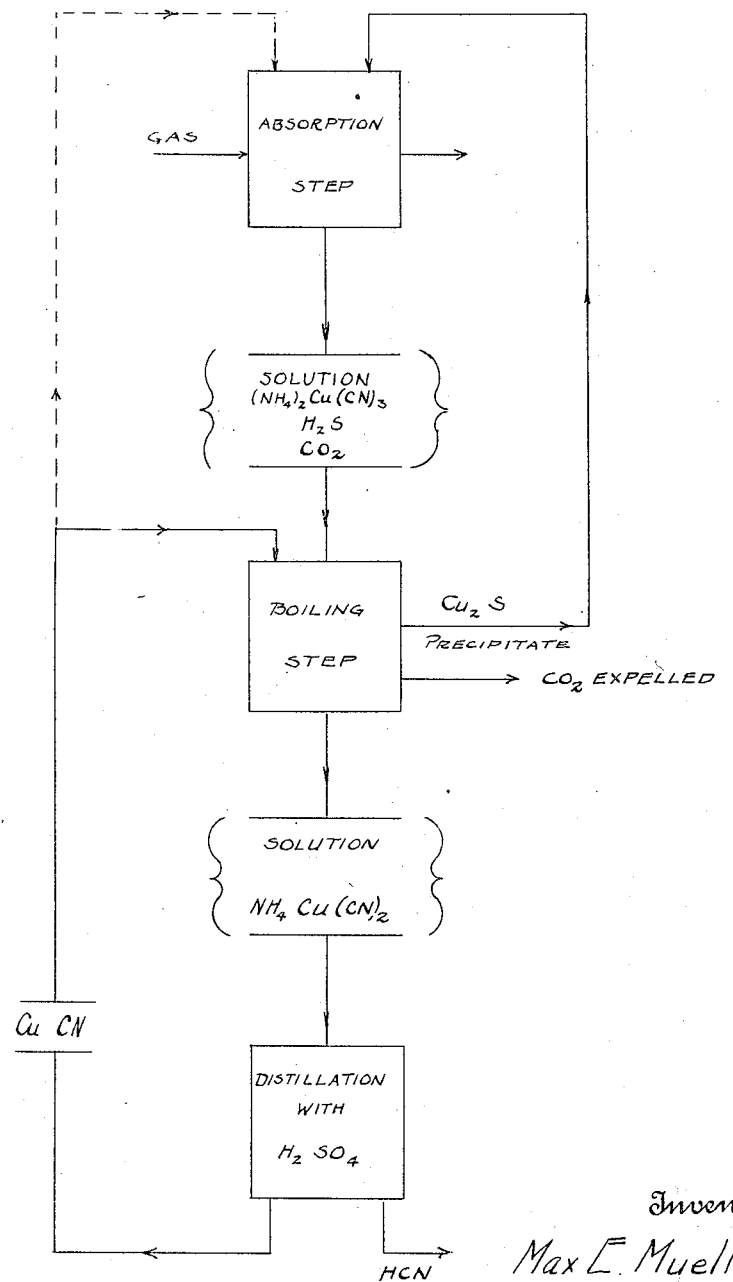

MAX E. MUELLER, OF YOUNGSTOWN, OHIO.

PROCESS FOR EXTRACTING HYDROCYANIC ACID FROM GASES.

1,413,763.　　　　Specification of Letters Patent.　　Patented Apr. 25, 1922.

Application filed March 10, 1921. Serial No. 451,215.

*To all whom it may concern:*

Be it known that I, MAX E. MUELLER, a citizen of the United States, and a resident of Youngstown, county of Mahoning, and State of Ohio, have invented a new and useful Improvement in Processes for Extracting Hydrocyanic Acid from Gases, of which the following is a specification, the principle of the invention being herein explained and the best mode in which I have contemplated applying that principle, so as to distinguish it from other inventions.

In the extraction or recovery of hydrocyanic acid from coal gas by means of copper compounds in the presence of ammonia, the solution obtained contains, besides ammonium cupro-cyanide, hydrogen sulphide combined as ammonium sulphide. If the solution thus obtained is distilled with dilute sulphuric acid the copper present in solution is converted either in whole or in part to cuprous sulphide and the cyanogen is liberated either wholly or in part and distills off as hydrocyanic acid. In all cases the maximum possible amount of cuprous sulphide will be formed. If there is an excess of hydrogen sulphide over the amount necessary to form cuprous sulphide with all the copper in solution then on distilling the solution with dilute sulphuric acid the copper will be precipitated completely as cuprous sulphide and the cyanide completely liberated as hydrocyanic acid. The excess of hydrogen sulphide will also be liberated and will contaminate the hydrocyanic acid. If there is an insufficiency of hydrogen sulphide to combine with all the copper in solution as cuprous sulphide, then on distilling the solution with dilute sulphuric acid the hydrogen sulphide will be completely precipitatel as cuprous sulphide and none will be driven off. In this case the excess of copper over and above that converted to cuprous sulphide will be converted to insoluble cuprous cyanide (CuCN) which is not decomposed by dilute sulphuric acid. Any excess of cyanide above that required to form cuprous cyanide with the excess of copper over the equivalent amount of hydrogen sulphide will be liberated and distil off. In order that no hydrogen sulphide be distilled off with the hydrocyanic acid it is therefore necessary that there be present in the solution at least two atoms of copper for each molecule of hydrogen sulphide.

The present improved method or process is based on the recognition of the foregoing conditions, and consists of the steps hereinafter fully described and particularly pointed out in the claims, the annexed drawing and the following description setting forth in detail one approved method of carrying out the invention, such disclosed mode, however, constituting but one of the various ways in which the principle of the invention may be used.

In said annexed drawing:—

The single figure there appearing is a diagrammatic representation of the several steps that enter into the process.

As one illustrative way in which the distilling off of hydrogen sulphide with the hydrocyanic acid may be avoided, the absorbing medium which in practice will consist of a suspension of cuprous sulphide in water, may be exposed to the action of the gas for a sufficient length of time to arrive at the necessary condition of two atoms of copper in solution for one molecule of hyrdogen sulphide. The amount of copper which goes into solution depends on the amount of hydrocyanic acid absorbed from the gas with the formation of an ammonium cupro-cyanide of the probable composition $(NH_4)_2Cu(CN)_3$. This would require the absorption of six molecules of hydrocyanic acid for every molecule of hydrogen sulphide. As coal gas contains a far higher proportion of hydrogen sulphide than of hydrocyanic acid, the absorption of the former will at first be far in excess of the ratio of one molecule of such sulphide to six molecules of the acid. The solution will, however, soon become saturated with the hydrogen sulphide so that if sufficient gas is passed through the solution with the resulting absorption of more hydrocyanic acid and solution of copper, a condition will be reached where there are more than two atoms of copper in solution for each molecule of the sulphide. Such a solution on distilling with dilute sulphuric acid will liberate hydrocyanic acid without any hydrogen sulphide.

By way of varying the foregoing procedure for obtaining the result stated, the solution obtained by scrubbing coal gas with water carrying a copper compound such as cuprous sulphide in suspension, may be heated to drive off a portion of the hydrogen sulphide in order to bring the ratio of the copper to the sulphide in solution to the ratio of at least two atoms of copper to one molecule of the sulphide. This operation, however, will usually result in some hydrocyanic acid being driven off with the sulphide.

Whichever procedure be followed, in order to insure the presence in the solution of at least two atoms of copper for each molecule of hydrogen sulphide, the solution obtained by scrubbing the coal gas with water carrying in suspension a compound of copper such as cuprous sulphide will contain in addition to ammonium cupro-cyanide and hydrogen sulphide, varying amounts of carbon dioxide as ammonium carbonate. On distilling this solution with dilute sulphuric acid the carbon dioxide will be liberated and contaminate the hydrocyanic acid distilled off. To overcome this difficulty the solution may be boiled before distilling with sulphuric acid, whereby the carbon dioxide is removed. At the same time, however, a considerable amount of the cyanide will be driven off as hydrocyanic acid. The loss of acid on boiling the solution to remove carbon dioxide can be prevented by adding to the solution an excess of cuprous cyanide. The addition of cuprous cyanide to the solution will result first, in precipitating any hydrogen sulphide present with the formation of cuprous sulphide and ammonium cupro-cyanide, as represented by the following equation:—

(1) $(NH_4)_2S + 3CuCN =$
$Cu_2S + (NH_4)_2Cu(CN)_3$

On heating the solution with an excess of cuprous cyanide the cuprous cyanide will dissolve, probably with the formation of another ammonium cupro-cyanide of the composition, $NH_4Cu(CN)_2$:—

(2) $(NH_4)_2Cu(CN)_3 + CuCN =$
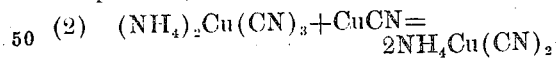
$2NH_4Cu(CN)_2$

The solution thus obtained may be boiled and the carbon dioxide driven off without appreciable loss of hydrocyanic acid. Then on distilling with dilute sulphuric acid, hydrocyanic acid free from both hydrogen sulphide and carbon dioxide will be liberated and there will remain an insoluble residue of cuprous cyanide:—

(3) $2NH_4Cu(CN)_2 + H_2SO_4 =$
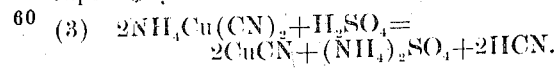
$2CuCN + (NH_4)_2SO_4 + 2HCN$

The cuprous cyanide produced is added to subsequent batches of solution obtained by scrubbing the gas in order to precipitate sulphides and prevent loss of hydrocyanic acid when the solution is boiled to remove carbon dioxide. The hydrocyanic acid liberated on distillation with sulphuric acid may be either absorbed in caustic soda or condensed as liquid hydrocyanic acid.

It would seem at first sight, that by use of this method of removing sulphides from the solution by the addition of cuprous cyanide the necessity of having two atoms of copper in solution for each molecule of hydrogen sulphide would be obviated. Such, however, is not the case. Unless this condition is observed it will be found that there will be an insufficiency of copper cyanide to repeat the cycle of operations over and over again. By observing the condition regarding the ratio of copper in solution to hydrogen sulphide the cycle of operations is self-sustaining, in so far as copper compounds are concerned. The various reactions in this case may be represented by equations (4), (5) and (6) which follow:—

(4) Absorption of HCN, $H_2S$ and $CO_2$ from gas;

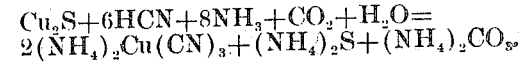
$Cu_2S + 6HCN + 8NH_3 + CO_2 + H_2O =$
$2(NH_4)_2Cu(CN)_3 + (NH_4)_2S + (NH_4)_2CO_3.$ It will be seen that when starting with cuprous sulphide no hydrogen sulphide can be absorbed from the gas and maintain the ratio of two atoms of copper to one molecule of such hydrogen sulphide in solution. Any of the latter absorbed in the early stages of the scrubbing operation must again be liberated in the latter stages.

(5) Treatment of the solution with CuCN and expelling of $CO_2$ by boiling:—

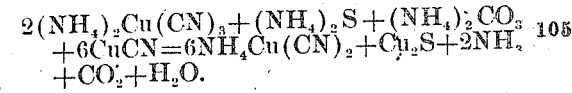
$2(NH_4)_2Cu(CN)_3 + (NH_4)_2S + (NH_4)_2CO_3$
$+ 6CuCN = 6NH_4Cu(CN)_2 + Cu_2S + 2NH_3$
$+ CO_2 + H_2O.$ (6) Distillation with dilute sulphuric acid;—

$6NH_4Cu(CN)_2 + 2NH_3 + 4H_2SO_4 =$
$6CuCN + 4(NH_4)_2SO_4 + 6HCN.$

By equation (6) the six molecules of hydrocyanic acid absorbed in equation (4) are liberated and the six molecules of copper cyanide needed for equation (5) are again produced. Furthermore, the one molecule of copper sulphide required in equation (4) is recovered by equation (5).

If the absorption of hydrocyanic acid and the solution of copper sulphide in the scrubber continues beyond the stage where there are two atoms of copper in solution for each molecule of hydrogen sulphide, or if the solution as it comes from the scrubber is heated and a portion of such sulphide removed so that the above ratio is exceeded, then the cycle of operations is still self sustaining in so far as the copper requirements are concerned. Assuming the amount of copper in solution is fifty per cent greater than required to fulfill the condition of two atoms of copper to one molecule of H₂S, the operations represented by equations (5) and (6) above, will be represented by equations (7) and (8), which follow:—

(7) 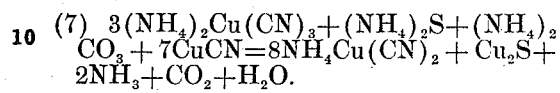

and—

(8) 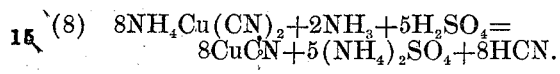

It will be seen that in this case there is more copper cyanide produced by equation (8) than is required for equation (7). This excess of CuCN may be returned to the scrubber with the copper sulphide produced by the step of equation (7) or the excess of copper cyanide may be withdrawn from the system and the copper so withdrawn may be replaced in some other form, for example, by additional copper sulphide.

I have found that in the operation of this process some sulphocyanide is produced which appears in the residue from the distillation with sulphuric acid as cuprous sulphocyanide. This in no way interferes with the process as the cuprous sulphocyanide is equally as effective as cuprous cyanide in preventing the loss of hydrocyanic acid when the solution from the absorption step of the process is boiled to expel carbon dioxide.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of recovering hydrocyanic acid from gases also containing hydrogen sulphide, carbon dioxide and ammonia, the step which consists in forming a double copper cyanide with said acid, there being present in the solution at least two atoms of copper for each molecule of hydrogen sulphide.

2. In a method of recovering hydrocyanic acid from gases also containing hydrogen sulphide, carbon dioxide and ammonia, the steps which consists in forming a double copper cyanide with said acid, there being present in the solution at least two atoms of copper for each molecule of hydrogen sulphide, and then distilling such solution with dilute acid capable of liberating hydrocyanic acid.

3. In a method of recovering hydrocyanic acid from gases also containing hydrogen sulphide, carbon dioxide and ammonia, the steps which consist in absorbing said acid by means of a copper compound in the presence of water, whereby a solution of a double ammonium copper cyanide is formed in which at least two atoms of copper are present for each molecule of hydrogen sulphide, and then distilling such solution with dilute sulphuric acid, whereby hydrocyanic acid is liberated and the copper present completely precipitated as copper sulphide and cyanide.

4. In a method of recovering hydrocyanic acid from gases also containing hydrogen sulphide, carbon dioxide and ammonia, the steps which consists in absorbing said acid by means of a copper compound in the presence of water, whereby a solution of a double ammonium copper cyanide is formed in which at least two atoms of copper are present for each molecule of hydrogen sulphide, and then distilling such solution with dilute sulphuric acid, whereby hydrocyanic acid is liberated and the copper present completely precipitated as copper sulphide and cyanide, and then returning such copper sulphide and cyanide to the first step for treating more gas.

5. In a method of recovering hydrocyanic acid from gases also containing hydrogen sulphide, carbon dioxide and ammonia, the steps which consist in absorbing said acid by means of a copper compound in the presence of water, whereby a solution of a double ammonium copper cyanide is formed, adding to such solution an excess of cuprous cyanide, boiling such solution to drive off the carbon dioxide, and then distilling such solution with dilute acid capable of liberating hydrocyanic acid.

6. In a method of recovering hydrocyanic acid from gases also containing hydrogen sulphide, carbon dioxide and ammonia, the steps which consists in absorbing said acid by means of a copper compound in the presence of water, whereby a solution of a double ammonium copper cyanide is formed, adding to such solution an excess of cuprous cyanide, boiling such solution to drive off the carbon dioxide, the cuprous cyanide precipitating any hydrogen sulphide present as cuprous sulphide, returning the latter to the first step for treating more gas, and then distilling such solution with dilute acid capable of liberating hydrocyanic acid.

7. In a method of recovering hydrocyanic acid from gases also containing hydrogen sulphide, carbon dioxide and ammonia, the steps which consists in absorbing said acid by means of a copper compound in the presence of water, whereby a solution of a double ammonium copper cyanide is formed, adding to such solution an excess of cuprous cyanide, boiling such solution to drive off the carbon dioxide, the cuprous cyanide precipitating any hydrogen sulphide present as cuprous sulphide, returning the latter to the first step for treating more gas, then distilling such solution with a dilute acid capable of liberating hydrocyanic acid, the copper present being precipitated as copper cyanide, and returning such cyanide to the resulting solution to precipitate further hydrogen sulphide.

Signed by me, this 3rd day of March, 1921.

MAX E. MUELLER